Aug. 2, 1949.   G. A. VISSER   2,478,031
MANUFACTURE OF BOURDON INSTRUMENTS
Filed Dec. 5, 1944
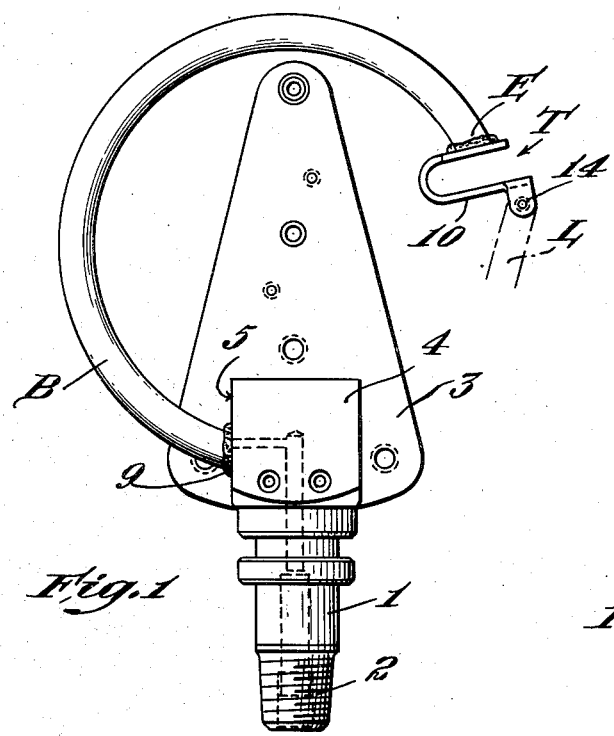
Fig.1
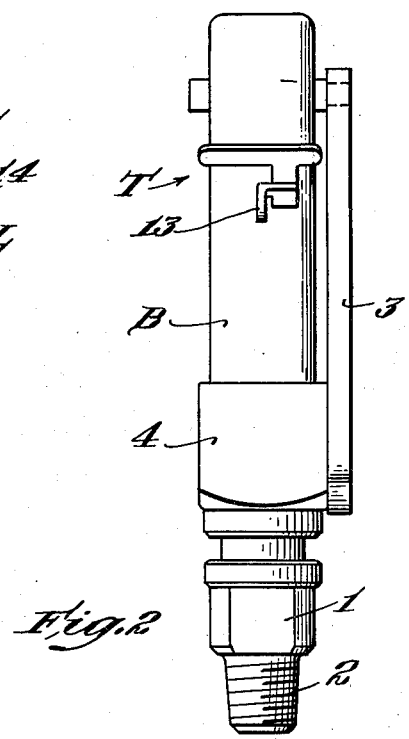
Fig.2
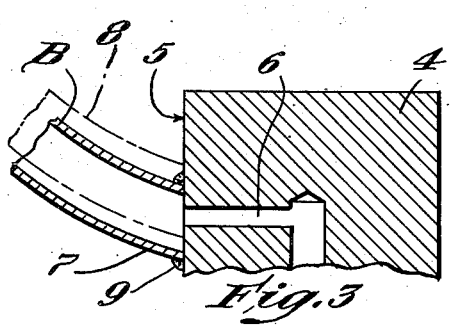
Fig.3
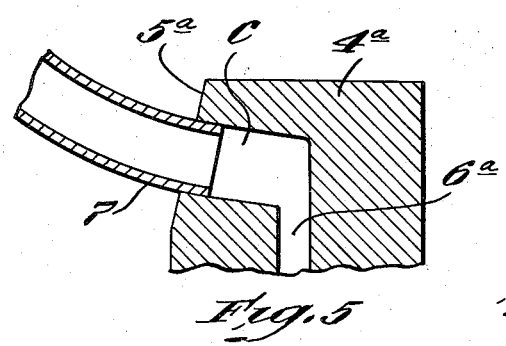
Fig.5
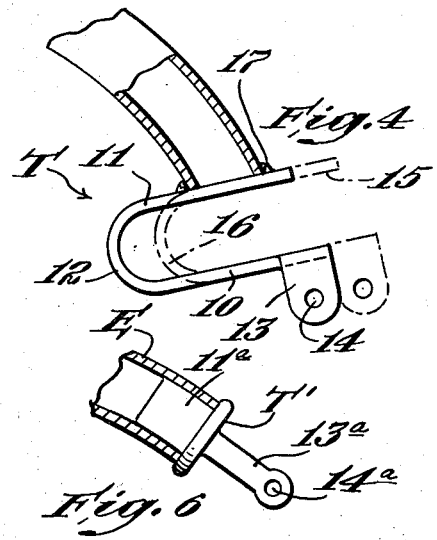
Fig.4
Fig.6
Inventor
Gerrit A. Visser
by Roberts Cushman Grover
Att'ys.

Patented Aug. 2, 1949

2,478,031

UNITED STATES PATENT OFFICE 2,478,031

MANUFACTURE OF BOURDON INSTRUMENTS

Gerrit A. Visser, Westport, Conn., assignor to Manning, Maxwell & Moore, Incorporated, New York, N. Y., a corporation of New Jersey Application December 5, 1944, Serial No. 566,744

1 Claim. (Cl. 29—148)

This invention pertains to pressure-responsive instruments, for instance, pressure gauges, dial thermometers, etc., wherein a Bourdon tube constitutes the pressure-sensitive element or motor, and relates more particularly to a novel method of assembling the Bourdon tube with and uniting it to associated parts, and to a novel construction useful in the practice of said method. The customary practice, in assembling a Bourdon tube with other parts of the instrument, is to insert one end of the tube into a cavity in the socket member of the instrument and to fix it therein by soldering or brazing, and to close the free end of the tube by means of a plug which fits within the tube or by means of a cap which fits over the tube, the plug or cap being secured leak-tight to the tube by solder or brazing, the plug or cap constituting part of the tube tip bracket to which one end of a motion-transmitting lever is attached by a pivotal element. It is highly important that the axis of this pivot element be accurately located initially, since the parts which constitute the movement mechanism are of predetermined dimensions, and thus any substantial variation in the initial position of said pivot element might make it impossible properly to calibrate the instrument.

However, Bourdon tubes cannot be made with any such degree of accuracy as most other machine parts, for uncontrollable variations in hardness, temper, wall thickness, and other factors which effect its final rolled curvature, make it substantially impossible to provide Bourdon tubes of accurately predetermined curvature and which are interchangeable one with another.

On the other hand, the customary mode of attaching the tube to the socket member and of securing the tip bracket to the tube afford substantially no opportunity for compensating variations in tube curvature, thereby to insure proper initial location of the pivot element which connects the motion-transmitting link to the tube tip bracket.

A principal object of the present invention is to provide a novel method of mounting a Bourdon tube on the socket member and/or attaching the tip bracket to the free end of the tube, whereby the pivot element which unites the tube tip bracket to the motion-transmitting lever may be accurately located initially, regardless of minor deviations in curvature of the tube from the theoretically correct curvature. A further object is to provide a novel form of tube and tube tip bracket such that the bracket may be moved transversely of the end of the tube to a substantial extent thereby properly to locate the pivot element before the tube tip and bracket are permanently joined. A further object is to provide a novel form of tube and socket member whereby the tube may be shifted bodily transversely of its length to a substantial extent before uniting it to the socket, thereby to locate the tube tip in the approximate desired point. Other and further objects and advantages of the invention will be pointed out in the following more detailed description and by reference to the accompanying drawings wherein Fig. 1 is a front elevation of the socket member and Bourdon tube of an instrument of the class described, the case, dial and movement mechanism being omitted;

Fig. 2 is a side elevation of the parts shown in Fig. 1;

Fig. 3 is a fragmentary vertical section, to larger scale, through the socket member, diametrically of the Bourdon tube;

Fig. 4 is a fragmentary front elevation to larger scale than Fig. 1, showing the tube tip bracket, with the end of the tube in diametrical section;

Fig. 5 is a view comparable to Fig. 3, but illustrating conventional prior practice in assembling the tube with the socket member; and Fig. 6 is a view comparable to Fig. 4, but illustrating conventional prior practice in assembling the tube tip bracket with the end of the tube.

Referring to the drawings, the numeral 1 designates the socket member of the instrument, this socket member having the attaching screw-threaded nipple portion 2, the upstanding plate-like portion or pad 3 which may itself form the rear member of the frame of the movement mechanism or to which such frame may be secured. The numeral 4 designates a block-like member constituting an integral part of the socket and to which the fixed end of the Bourdon tube B is secured. This block 4 has the vertical, flat outer surface 5. The fluid passage 6, which extends up through the socket member 1 and into the block 4, has a lateral offset which terminates at the surface 5.

That end 7 of the Bourdon tube B which is to be fixed to the socket member is cut off so that it is plane, the tube wall having a smooth edge, and in assembling the tube with the socket member this plane end of the tube is butted against the surface 5, being so located that the wall of the tube encircles the mouth of the passage 6. Then the tube is bodily shifted, as indicated by the broken line 8, until the opposite or free end E of the tube is located approximately at the desired point. However, in such bodily movement of the tube, the end 7 which contacts the surface 5 is never shifted sufficiently to cause the wall of the tube to intersect the mouth of the passage 6. When the tube has thus been shifted to the proper location, it is molecularly and permanently united leak-tight to the block 4, for example by welding, as indicated at 9. This welding operation may be performed in any suitable manner. By proceeding in this way, in which the end 7 of the tube is butted against a flat surface 5 of greater area than the transverse area of the tube, it is possible to shift the tube freely before it is united to the block 4. As contrasted with this improved procedure, the customary prior procedure illustrated in Fig. 5, does not admit of such bodily shift of the tube. Thus in the customary prior procedure, the block 4ᵃ has the passage 6ᵃ which terminates in a chamber or cavity C opening at the outer surface 5ᵃ of the block, the cavity C being shaped to receive the end portion 7 of the tube with a snug fit. Having introduced the end 7 of the tube into this cavity, the tube is then permanently united to the block by solder or brazing, but it will be observed that in this procedure no provision is made for any bodily shift of the tube relatively to the block 4ᵃ prior to the union of the parts.

In accordance with the present invention, provision is also made for adjusting the tube tip bracket T relatively to the tube before it is united to the latter. Thus, as illustrated in Fig. 4, a preferred form of tube tip bracket consists of a length of sheet material bent to U-shape so as to form substantially parallel legs 10 and 11, united by a bend 12. As illustrated, the leg 10 has an integral ear or tab bent at right angles to the wide face of the leg 10 and furnished with an opening 14 for the reception of a pivot pin for connecting a motion-transmitting link L to the tube tip bracket. This opening 14 thus defines the axis of the pivotal connection between the bracket and the link.

The outer surface of the leg 11 of the tube tip bracket is flat and smooth and of a width at least as great as the outer diameter of the tube and of a length substantially greater than the tube diameter. The end E of the tube is cut off to provide a plane surface (constituted by the end edge of the tube) and in assembling the parts this end of the tube is brought into contact with the outer surface of the member 11 of the tip bracket and the tip bracket is shifted, as indicated by the broken lines at 16 (Fig. 4) until the opening 14 has been accurately located at the proper position relatively to the socket. The end of the tube is then united by welding, as indicated at 17, in accordance with any desired procedure, so as to secure the tube tip bracket leak-tight to the tube and thereby forming a closure for the end of the tube.

As contrasted with this novel method of securing the tube tip to the tube, the prior usual practice, as illustrated in Fig. 6, involves the provision of a tube tip bracket T′ comprising a plug portion 11ᵃ designed to fit snugly within the end of the tube, and an arm portion 13ᵃ having an aperture 14ᵃ for the reception of the link-connecting pivot pin. When the plug 11ᵃ has been inserted in the tube the parts are united by solder or brazing. Obviously this prior procedure does not permit any shifting of the tube tip bracket relatively to the tube before they are united.

The tube tip bracket of the present invention may not only be shifted bodily relatively to the tube before the parts are permanently united, but by reason of the shape of the tube tip bracket itself it is possible, after the parts have been united, by bending the bracket at the bend 12, to vary the position of the opening 14 up and down to a certain extent, thereby providing further facilities for adjustment.

While a desirable procedure, and stage products useful in the practice of such procedure have here been illustrated by way of example, it is to be understood that the invention is not necessarily limited to the precise steps or order of steps herein suggested, nor to the employment of stage products exactly like those here disclosed, the invention being of broader scope as defined by the appended claim.

I claim:

That method of making a Bourdon tube instrument which comprises as steps providing a socket member designed to support moving parts actuable by the Bourdon tube and having a flow passage terminating at a substantially flat outer surface of the socket member, providing a Bourdon tube having plane ends, butting one end of the tube against the flat outer surface of the socket member with the wall of the tube embracing the mouth of the passage, bodily shifting the tube until its opposite or free end is approximately at the correct position, then uniting the tube leak-tight to the socket member, providing a tube tip bracket having a substantially flat surface, the bracket also including a part which defines the pivotal axis of a connection for uniting the bracket to a motion-transmitting member, engaging the flat surface of the bracket with the free end of the tube, sliding the bracket transversely of the end of the tube in a direction other than that of the first adjustment until said pivotal axis is correctly located, and uniting the bracket leak-tight to the tube.

GERRIT A. VISSER.

REFERENCES CITED

The following references are of record in the file of this patent:

UNITED STATES PATENTS

| Number | Name | Date |
| --- | --- | --- |
| 647,164 | Staaf | Apr. 10, 1900 |
| 1,315,327 | Place | Sept. 9, 1919 |
| 1,502,873 | Oborg | July 29, 1924 |
| 1,838,005 | Sieper | Dec. 22, 1931 |
| 1,902,931 | Zubaty | Mar. 28, 1933 |
| 2,192,904 | Ferris | Mar. 12, 1940 |
| 2,310,434 | Hyman | Feb. 9, 1943 |